United States Patent [19]
Nishide

[11] Patent Number: 5,354,399
[45] Date of Patent: Oct. 11, 1994

[54] METHOD FOR SETTING BLADDER OUTER DIAMETER OF TIRE FORMING DRUM IN A METHOD FOR ATTACHING BELT-SHAPED MEMBER TO THE BLADDER

[75] Inventor: Seiichiro Nishide, Kodaira, Japan

[73] Assignee: Bridgestone Corporation, Tokyo, Japan

[21] Appl. No.: 16,248

[22] Filed: Feb. 11, 1993

[30] Foreign Application Priority Data

Feb. 21, 1992 [JP] Japan .................. 4-070001

[51] Int. Cl.$^5$ .......................... B29D 30/30
[52] U.S. Cl. .................. 156/133; 156/123; 156/405.1; 156/416
[58] Field of Search ............ 156/117, 110.1, 121, 156/123, 130, 133, 134, 405.1, 406.4, 401, 397, 416, 421.6, 187, 447; 242/72 B, 74, 74.1, 74.2, 18 EW, 18 PW

[56] References Cited

U.S. PATENT DOCUMENTS

| | | |
|---|---|---|
| 2,988,131 | 6/1961 | Frohlich et al. |
| 3,479,238 | 11/1969 | Kehoe et al. |
| 4,370,183 | 1/1983 | Albo .................. 156/117 |
| 4,596,617 | 6/1986 | Ishii . |
| 4,812,196 | 3/1989 | Ishii . |
| 5,080,738 | 1/1992 | Araki et al. .............. 156/401 X |

FOREIGN PATENT DOCUMENTS

| | | |
|---|---|---|
| 455713 | 1/1928 | Fed. Rep. of Germany . |
| 1144912 | 8/1958 | Fed. Rep. of Germany . |
| 2510507 | 2/1983 | France . |
| 63-95939 | 4/1988 | Japan . |

Primary Examiner—Geoffrey L. Knable
Attorney, Agent, or Firm—Sughrue, Mion, Zinn, Macpeak & Seas

[57] ABSTRACT

The forward end of a belt-shaped member is transferred to a predetermined position on the outer circumferential surface of a bladder, and pressurized air is filled into the bladder, while it is rotated. When the bladder has been inflated to a predetermined diameter, the filling of the pressurized air is stopped and at the same time the rotation of the bladder is stopped to set it at the predetermined diameter. The forward end of the belt-shaped member is fixed on the bladder by means of a fixture, and the bladder is rotated together with the fixture to wind and attach the belt-shaped member around and to the outer circumferential surface of the bladder. Thereafter, the fixture is removed from the bladder after completion of the attaching of the belt-shaped member to the bladder.

4 Claims, 4 Drawing Sheets

FIG_3

METHOD FOR SETTING BLADDER OUTER DIAMETER OF TIRE FORMING DRUM IN A METHOD FOR ATTACHING BELT-SHAPED MEMBER TO THE BLADDER

BACKGROUND OF THE INVENTION

The present invention relates to a method and an apparatus for setting the outer diameter of a bladder of a tire forming drum, and more particularly to a method and apparatus for attaching a belt-shaped member to the outer circumferential surface of the bladder of the tire forming drum.

In building a tire, there is a step of winding a belt-shaped member made of a raw rubber around a forming drum to attach the member to the drum as shown in, for example, Japanese Patent Application Laid-open No. 63-95,939. In the attaching step using the apparatus disclosed in this Japanese Publication, the forward end of a belt-shaped member is held at a position on the outer circumferential surface of a forming drum made of a steel by means of a restraining jig, and then the forming drum is rotated to attach the trailing portion of the belt-shaped member on the outer circumferential surface of the drum successively. The restraining jig is provided with suction portions of magnets at both the ends and a sponge-like material at the center. As the magnets at both the ends of the jig are attracted to the forming drum made of the steel, the forward end of the belt-shaped member is held by the sponge-like material at the center of the jig.

Other than the drum made of a metal as described above, there are often used forming drums having air bags (bladders) made of rubbers which are filled with pressurized air to be inflated to predetermined outer diameters. In attaching a belt-shaped member to such a forming drum having such bladders, it has, in the past, been necessary to manually arrange belt-shaped members of a predetermined length around the bladders having outer circumferential surfaces tapered in their axial directions and to manually adjust the positions of the belt-shaped members on the bladders after filling pressurized air into the bladders to exhibit horizontal outer circumferential surfaces.

However, bladders often do not exhibit constant outer diameters when being inflated due to deterioration with age or the like. Therefore, if belt-shaped members are attached to such bladders in the manner according to the procedure disclosed in the Japanese Patent Application Laid-open No. 63-95,939, the joined lengths at the ends of the members unavoidably lie in a wide range. In such a prior art, accordingly, the belt-shaped members are previously formed into rings to have optimum joined lengths and then arranged around the bladders before being inflated. Thereafter, the belt-shaped members are formed into predetermined shapes by inflating the bladders as described above.

Before or during being inflated, however, the bladders have outer circumferential surfaces tapered in their axial directions, that is to say, outer diameters are different at their axial positions. Therefore, the ring-shaped members arranged around the bladders tend to move in their axial directions. Consequently, it has been required to manually adjust the members around the bladders into finally optimum positions as described above.

SUMMARY OF THE INVENTION

It is an object of the invention to provide a method and an apparatus for exactly setting the diameter of a bladder of a tire forming drum at a predetermined value before starting attaching operation of a belt-shaped member to the bladder, in order to eliminate manual attaching operations of belt-shaped members to the bladder and to automatize such attaching operations.

It is another object of the invention to provide a method and an apparatus for attaching belt-shaped members with high efficiency onto a bladder whose outer diameter has been set at a predetermined value.

In order to accomplish the first object of the invention, the method for setting the outer diameter of at least one bladder of a tire forming drum according to the invention comprises steps of filling pressurized air into the bladder being rotated, detecting the fact that the bladder has been inflated to a predetermined diameter by utilizing the movement of a contact member in contact with the outer circumferential surface of the rotating bladder to move in its radial direction with the inflation of the bladder, stopping the filling the pressurized air at the same time of the detection of that fact, and stopping the rotation of the bladder after stopping filling of pressurized air into all bladders.

According to the invention, the bladder is filled with pressurized air, while being rotated so that the bladder is inflated uniformly over its outer circumference. When the bladder has been inflated to a predetermined outer diameter, it can be very exactly detected with the aid of the movement of the contact member in contact with the outer circumferential surface of the bladder. At the same time the filling of the pressurized air into the bladder is stopped so that the outer diameter of the bladder can be very exactly set at the predetermined value. In the case that the tire forming drum has a plurality of bladders, the above steps are effected for the bladders, respectively, and the rotations of all the bladders are stopped after completion of filling the pressurized air into all the bladders or after completion of setting the diameters of all the bladders.

The apparatus for setting the outer diameter of at least one bladder of a tire forming drum according to the invention comprises rotatively driving means for rotating the bladder, air supply means for supplying and exhausting pressurized air into and from the bladder, a contact member in contact with the outer circumferential surface of the bladder to move outwardly in response to expansion of its diameter, and outer diameter detection means for detecting the movement of the contact member and outputting command signals to the air supply means and the rotatively driving means when the bladder has been inflated to a predetermined diameter, said air supply means stopping the air supply to the bladder upon receipt of the command signal, and said rotatively driving means stopping the rotation of the bladder only after outputting the command signals to the driving means for all bladders.

In order to accomplish the second object of the invention, the method for attaching a belt-shaped member to the outer circumferential surface of at least one bladder of a tire forming drum according to the invention comprises steps of transferring the forward end of at least one belt-shaped member to a predetermined position on the outer circumferential surface of the bladder, filling pressurized air into the bladder, while it is rotated, stopping the filling of the pressurized air when the bladder has been inflated to a predetermined diameter, stopping the rotation of the bladder to set it at the predetermined diameter, fixing the forward end of the belt-shaped member on the bladder by means of a fixture, rotating the bladder together with said fixture to wind and attach the belt-shaped member around and to the outer circumferential surface of the bladder, and removing said fixture from the bladder after completion of the attaching of the belt-shaped member to the bladder.

According to the invention, a belt-shaped member can be attached to the outer circumferential surface of a bladder with high efficiency without requiring any manual operation.

The apparatus for attaching a belt-shaped member to the outer circumferential surface of at least one bladder of a tire forming drum according to the invention comprises at least one transfer means for transferring the forward end of the belt-shaped member to a predetermined position on the outer circumferential surface of the bladder, rotatively driving means for rotating the bladder, air supply means for supplying and exhausting pressurized air into and from the bladder, a contact member in contact with the outer circumferential surface of the bladder to move outwardly in response to expansion of its diameter, outer diameter detection means for detecting the movement of the contact member and outputting command signals to the air supply means to stop the supply of the air and to the rotatively driving means to stop the rotation of the bladder when the bladder has been inflated to a predetermined diameter, an iron ring adjacent said bladder and rotatable together with the bladder, a fixture extending between the iron ring and said the predetermined position on the outer circumferential surface of the bladder and provided with a magnet at its one end on the side of the iron ring and formed with a restraining portion on the other end on the side of the bladder for urging the forward end of the belt-shaped member to the outer circumferential surface of the bladder, and a fixture holding unit vertically movable and releasably holding said fixture.

The invention will be more fully understood by referring to the following detailed specification and claims taken in connection with the appended drawings.

DESCRIPTION OF THE PREFERRED EMBODIMENTS

Figure 1:
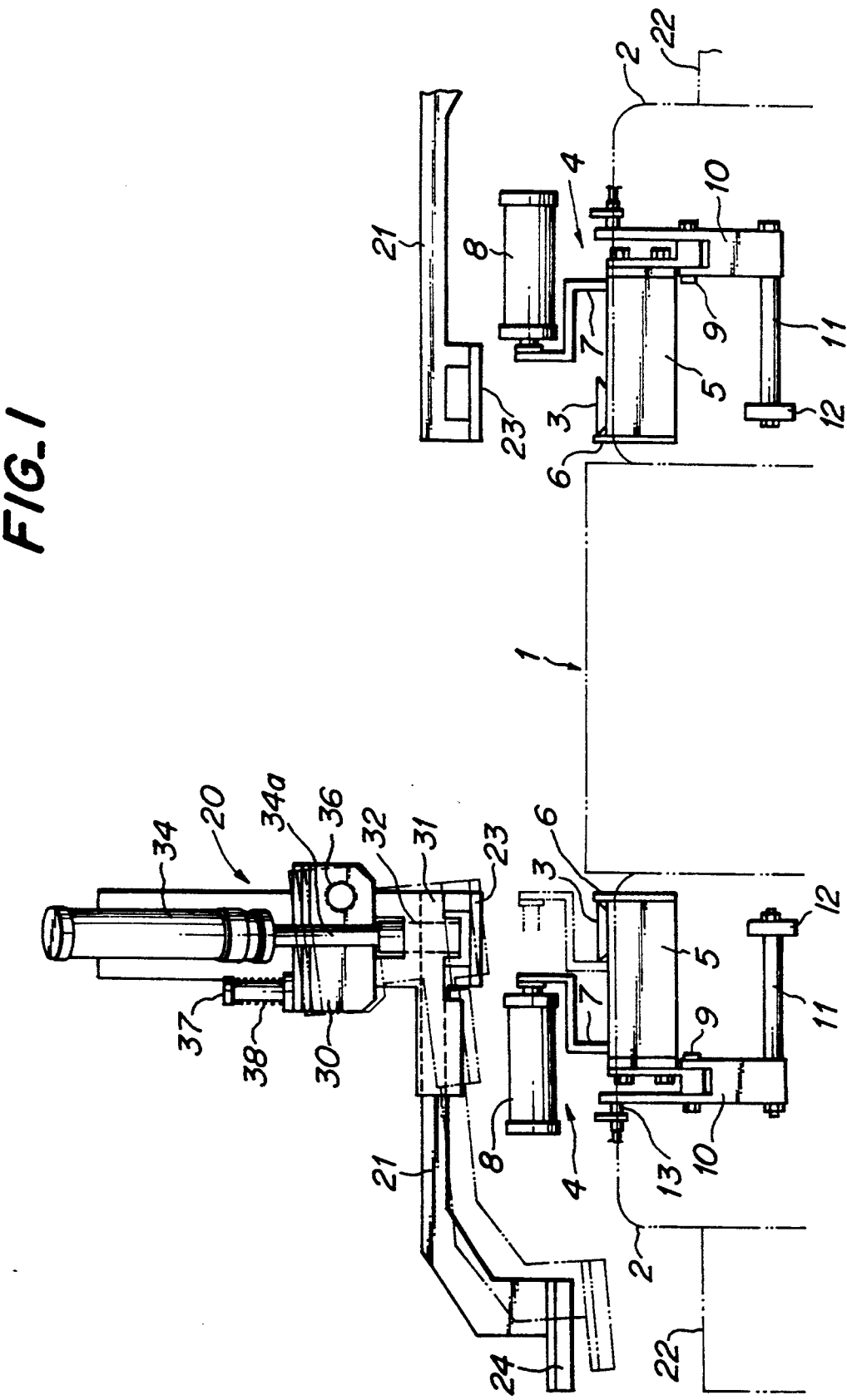
FIG. 1 is a front view of a tire building machine to which the present invention is applied.
Figure 2:
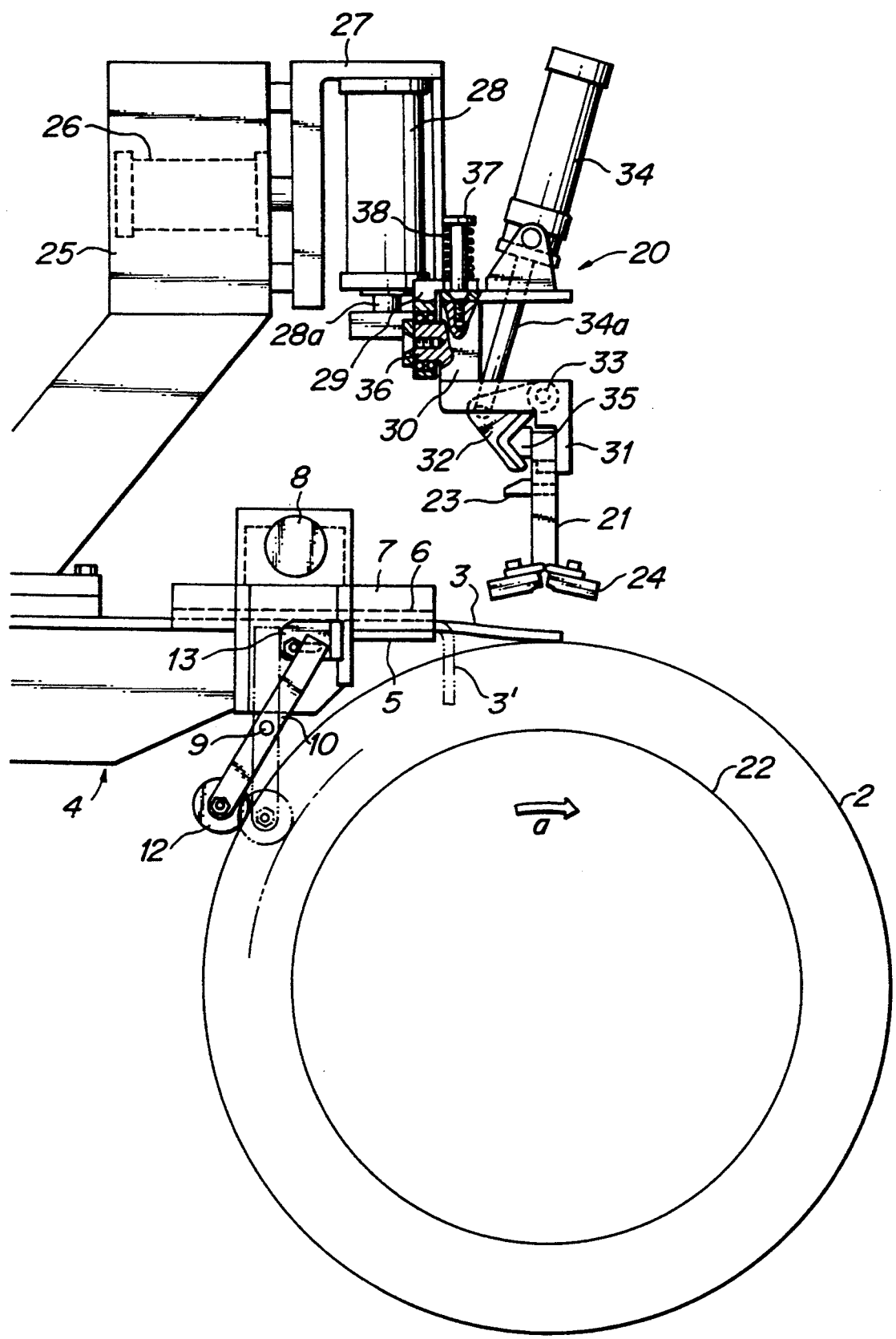
FIG. 2 is a side view illustrating the tire building machine shown in FIG. 1.

Referring to FIGS. 1 and 2 illustrating a tire building machine to which is applied the invention, a forming drum 1 includes a pair of bladders 2 arranged one on each side of the drum 1. The bladders 2 are rubber bags which are inflated into drums of a predetermined shape when pressurized air is filled thereinto. These bladders 2 are rotated in unison, while belt-shaped members 3 are wound around and attached to the bladders 2. The belt-shaped member 3 is a tire constituent member including a raw rubber.

The bladders on both sides viewed in FIG. 1 and other components associated therewith are symmetrically identical in construction to each other. Therefore, the bladder on the left side in FIG. 1 and the associated components will be mainly explained herein.

Arranged adjacent and on one side of each of the bladders 2 is a belt-shaped member supply unit 4 from which a belt-shaped member 3 is transferred in its longitudinal direction on an air table 5 extending from the unit 4 and is supplied onto the outer circumferential surface of the associated bladder 2 at a predetermined position with respect to the width direction of the bladder 2. During such a transfer of the belt-shaped member 3, it is guided and positioned on the air table 5 by a guide piece 6 and a guide plate 7 which embrace the belt-shaped member 3 on both its sides. For this purpose, the guide piece 6 is arranged along one side edge of the air table 5, while the guide plate 7 is operatively connected to a cylinder 8 to be moved on the table 5 in its width direction by the actuation of the cylinder 8.

In rear of the air table 5, a rocking arm 10 is pivotally supported on a pivot pin 9 parallel to the axis of the bladder 2 (FIG. 2) and extends substantially upward and downward of the pivot pin 9. Extending from the lower end of the rocking arm 10 in the axial direction of the bladder 2 is a rod 11 rotatably supporting on its free end a contact roller 12 adapted to be always in contact with the outer circumferential surface of the bladder 2. When the deflated bladder 2 is filled with pressurized air to be inflated, therefore, the rocking arm 10 is correspondingly rocked about the pivot pin 9 from the position shown in phantom lines to the position shown in solid lines in FIG. 2.

In this case, the upper end of the rocking arm 10 moves in the direction opposite to the direction in which the lower end of the arm 10 moves. A contactless switch or sensor 13 is provided in the proximity of the rocking passage of the upper end of the rocking arm 10 so as to be in opposition to it. When the outer diameter of the bladder 2 becomes a predetermined diameter as shown in solid lines in FIG. 2, a contact less sensor 13 detects the rocking arm 10 and generates a detection signal. Consequently, the contact roller 12, the rocking arm 10 and the contactless sensor 13 form outer diameter detection means for detecting the fact that the outer diameter of the bladder 2 has just become the predetermined diameter.

The procedure for setting the outer diameter of the bladder 2 at the predetermined value with the outer diameter detection means will be explained.

Figure 3:
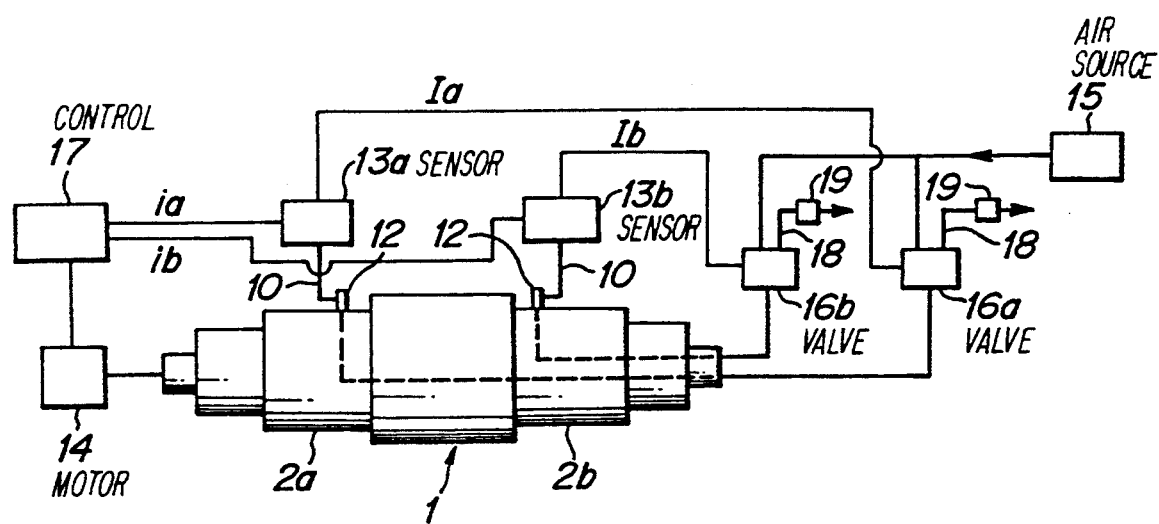
FIG. 3 is a circuit diagram for controlling the tire forming drum shown in FIG. 1.
Figure 4:
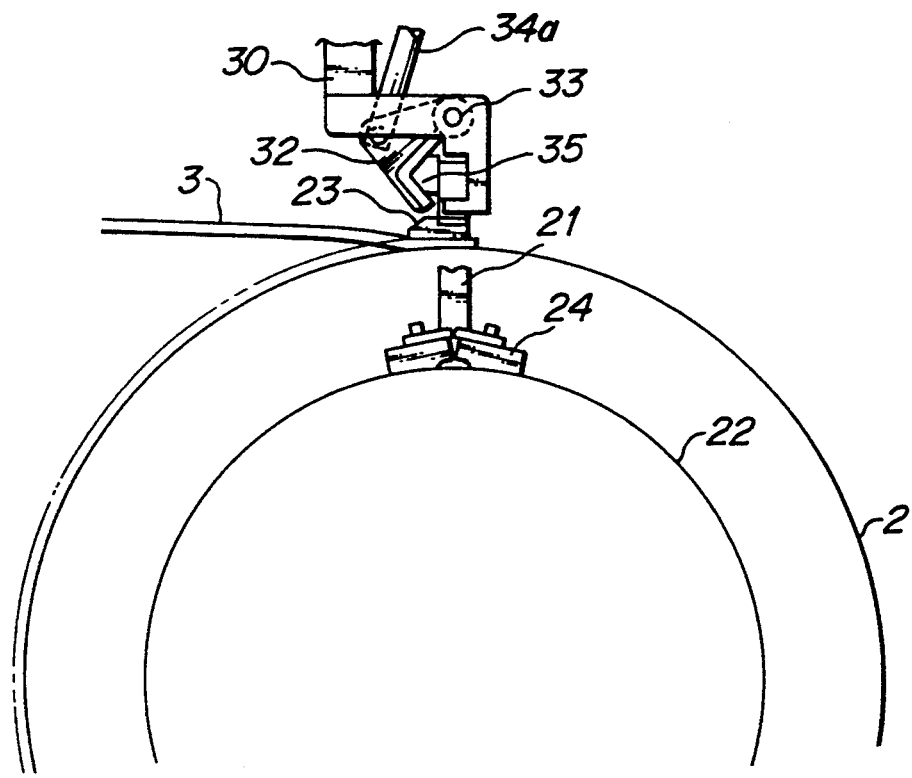
FIG. 4 is a side view illustrating the fixture positioned on the bladder and grasped by the fixture holding unit used in the apparatus according to the invention.

Referring to FIG. 3 illustrating a control circuit for the forming drum 1, a motor 14 rotatively drives the whole the forming drum 1 including the pair of bladders 2a and 2b and others. The bladders 2a and 2b are supplied with pressurized air from a pressurized air source 15 such as a compressor through control valves 16a and 16b to be inflated or deflated. During the inflation, the bladders 2a and 2b are rotatively driven by the motor 14, while the rocking arms 10 rocks correspondingly to the increase of their outer diameters, respectively. For example, when the bladder 2a is inflated to the predetermined outer diameter earlier than the other bladder 2b, the contactless sensor 13a associated therewith detects it and sends a command signal Ia to the control valve 16a which then stops the supply of the pressurized air to the bladder 2a. The bladder 2a is maintained inflated with the predetermined diameter owing to the pressurized air filled therein.

In the similar manner, when the bladder 2b is inflated to the predetermined outer diameter, the contactless sensor 13b associated therewith detects it and sends a command signal Ib to the control valve 16b which then stops the supply of the pressurized air to the bladder 2b which is then maintained inflated with the predetermined diameter. As the setting of the outer diameters of both the bladders 2a and 2b are performed independently in the manner described above, they are correctly inflated to the predetermined outer diameters even if they are inflated at different speeds.

In the above procedure, the contactless sensor 13a and 13b send command signals ia and ib to motor control means 17 at the same time when the command signals Ia and Ib are sent to the control valves 16a and 16b, respectively. When the control means 17 has received both the command signals ia and ib, that is to say, after both the bladders 2a and 2b have been inflated to the predetermined outer diameters, the motor 14 is deenergized to stop the bladders 2a and 2b maintained inflated in the predetermined outer diameters. Reference numeral 18 in FIG. 3 denotes an air outlet having a silencer 19 through which the pressurized air in the bladders 2a and 2b is exhausted when the control valves 16a and 16b are changed-over.

The belt-shaped members 3 are wound around and attached to the outer circumferential surfaces of the pair of bladders 2 set with the predetermined outer diameters in the manner described above. For this purpose, the forward end of the belt-shaped member 3 is projected a predetermined length from the front end of the air table 5 before starting to fill the pressurized air into each of the bladders 2 or during filling the air into it. At that time, as the bladder 2 has not been inflated to the sufficient outer diameter yet, the forward end of the belt-shaped member 3 hangs downwardly from the front end of the air table 5 as shown in chain lines 3' in FIG. 2.

The bladder 2 is successively inflated, while being rotated in the direction shown by an arrow a (FIG. 2). On its way to the predetermined diameter, the forward end 3' of the belt-shaped member 3 comes into contact with the outer circumferential surface of the bladder 2. Thereafter, the forward end 3' of the belt-shaped member 3 is pulled by the outer circumferential surface of the bladder 2 with the frictional force therebetween in its rotating direction so as to be raised upwardly. When the bladder 2 has been inflated to the predetermined outer diameter and its rotation has been stopped, the forward end 3' of the belt-shaped member 3 is in contact with the outer circumferential surface of the bladder 2 at a predetermined position thereon as shown in solid lines in FIG. 2. The position of the forwardmost end of the belt-shaped member 3 in the circumferential direction of the bladder 2 is determined by the projected length of the belt-shaped member 3 from the air table 5, while the position of the belt-shaped member 3 in the width direction of the bladder 2 is determined by the guide piece 6 and the guide plate 7.

A fixture 21 held by a fixture holding unit 20 is lowered onto the forward end of the belt-shaped member 3 located at the predetermined position on the outer circumference of the bladder 2 to fix the forward end on the outer circumference of the bladder 2. The constructions of the fixture 21 and the fixture holding unit 20 will be explained hereinafter. The fixture holding unit 20 on the right side in FIG. 2 is omitted from the drawing.

An iron ring 22 is coaxially provided adjacent the outer end surface of each of the bladders 2. The fixture 21 in the form of a lever extends above the bladder 2 in its axial direction and has an inner end positioned above the forward end of the belt-shaped member 3 positioned on the outer circumferential surface of the bladder 2 and an outer end positioned above the iron ring 22. A restraining piece 23 is fixed to the inner end of the lever-shaped fixture 21 for urging the forward end of the belt-shaped member 3 to the outer circumferential surface of the bladder 2, while a magnet piece 24 is fixed to the outer end of the fixture 21, which is attracted to the iron ring 22. The lever-shaped fixture 21 is curved to provide a difference in height between its inner and outer ends so that the magnet piece 24 is brought into contact with the iron ring 22 when the restraining piece 23 urges the forward end of the belt-shaped member 3 against the bladder 2.

The fixture holding unit 20 comprises a horizontally movable member 27 mounted on a support member 25 fixed to the supply unit 4 to be horizontally movable by means of a cylinder 26, a lift member 29 provided on the horizontally movable member 27 to be vertically movable by means of a cylinder 28, and a grasping member 30 mounted on the lift member 29 for grasping the inner end of the fixture 21.

The grasping member 30 is integrally formed with hook piece 31 downwardly extending along one side of the fixture 21 for supporting it. A latch piece 32 is rockably supported on the grasping member 30 by means of a pivot pin 33. The grasping member 30 is further provided with a cylinder 34 having a piston rod 34a whose outer end is connected to the latch piece 32. When the cylinder 34 is actuated to extend its piston rod 34a therefrom, the latch piece 32 is pivotally moved about the pivot pin 33 in the counterclockwise direction viewed in FIG. 2 to engage an engaging projection 35 provided on the fixture 21. The fixture 21 is embraced by the hook piece 31 and the latch piece 32 to be grasped by the grasping member 30 in this manner and supported above the bladder 2.

The grasping member 30 is provided with a pivot shaft 36 on its rear surface at an offset position from its center. The pivot shaft 36 is rotatably fitted in the lift member 29. A shaft piece 37 is provided on the upper surface of the grasping member 30 on the opposite side of the pivot shaft 36 and extending upward through the lift member 29. A spring 38 is arranged in a compressed state between the head of the shaft piece 37 and the upper surface of the lift member 29 so that the portion of the grasping member 30 having the shaft piece 37 is always raised by the spring 38. As a result, the grasping member 30 is kept horizontally as shown in solid lines in FIG. 1.

When the bladder 2 has been inflated to the predetermined diameter and the forward end of the belt-shaped member 3 has occupied the predetermined position on the outer circumferential surface of the bladder 2, the rotation of the bladder 2 is stopped as described above. At the moment, the cylinder 28 is actuated to extend its piston rod 28a so that the lift member 29, grasping member 30 and the fixture 21 grasped thereby are lowered. As a result, the forward end of the belt-shaped member 3 is restrained by the restraining piece 23 of the fixture 21 against the outer circumferential surface of the bladder 2, while the magnet piece 24 is attracted to the outer circumferential surface of the iron ring 22.

Figure 5:
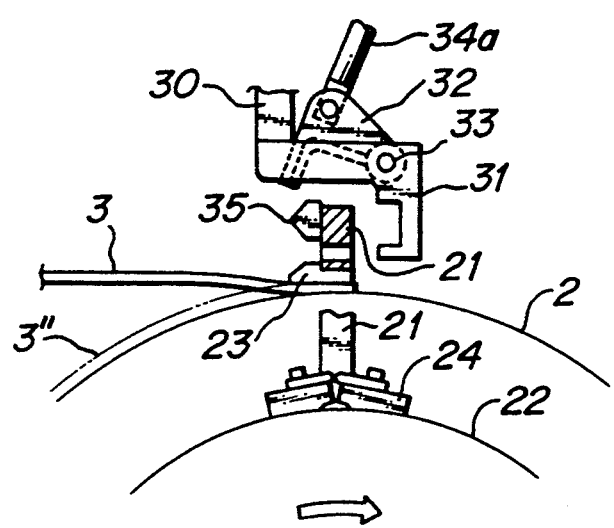
FIG. 5 is a side view illustrating the fixture positioned on the bladder and released from the fixture holding unit shown in FIG. 4.

The cylinder 34 is then actuated to retract the piston rod 34a so that the latch piece 32 is pivoted about the pivot pin 33 in the clockwise direction viewed in FIG. 5 so as to disengage from the engaging projection 35 of the fixture 21. Further, the cylinder 26 is actuated to advance the horizontally movable member 27, so that hook piece 31 completely disengages from the fixture 21 as shown in FIG. 5 and the fixture 21 is released from the grasping member 30. After the fixture 21 is released from the grasping member 30, the fixture holding unit 20 is retracted upward by the actuation of the cylinder 28. The fixture 21, which remains on the bladder 2, is attracted to the iron ring 22 with the aid of the magnet piece 24 provided on the end of the fixture 21. Therefore, the forward end of the belt-shaped member 3 is firmly restrained to the outer circumferential surface of the bladder 2 by means of the restraining piece 23.

After the forward end of the belt-shaped member 3 is fixed at the predetermined position on the outer circumferential surface of the bladder 2, the motor 14 is energized to rotate the bladder at a predetermined rotating speed and at the same time the belt-shaped member 3 is fed from the supply unit 4 at a predetermined speed. As the iron ring 22 is rotated together with the bladder 2, the fixture 21 is rotated together with the bladder 2, urging the forward end of the belt-shaped member 3 against the bladder 2. The belt-shaped member 3 is attached to the outer circumferential surface of the bladder 2 as shown in chain lines 3" in FIG. 5. As the outer diameter of the bladder 2 has been correctly set at the predetermined value, the forward and rearward ends of the belt-shaped member 3 correctly coincide with each other when the bladder 2 has been rotated one revolution. Moreover, in order to avoid any interference of the fixture 21 rotating together with the bladder 2 with the air table 5, the entire supply unit 4 is somewhat retracted from the bladder 2 at the commencement of the rotation of the bladder 2.

Upon completion of the attachment of the belt-shaped member 3 to the bladder 2, the fixture holding unit 20 is lowered and the fixture 21 is grasped by the grasping member 30 in the manner reverse to the releasing operations described above. The fixture holding unit 20 is then raised to move the fixture 21 away from the bladder 2.

At this time, the grasping member 30 is pivotally supported by the lift member 29 through the pivot shaft 36 which is offset on one side with respect to the center of the grasping member 30, and the other portion of the grasping member 30 is resiliently pulled upward by the spring 38. Therefore, the grasping member 30 and the fixture 21 grasped thereby are pivotally rotated as shown in chain lines in FIG. 1 about the pivot shaft 36 because the magnet piece 24 fixed to the end of the fixture is attracted to the iron ring 22. Therefore, the magnet piece 24 can be relatively easily removed from the iron ring 22 as a result of utilizing the principle of "lever". After the magnet piece 24 has been removed from the iron ring 22, the grasping member 30 and the fixture 21 are returned to their horizontal positions by the action of the spring 38 as shown in solid lines in FIG. 1.

As can be seen from the above explanation, according to the invention the outer diameter of the bladder can be exactly set at the predetermined value, and belt-shaped members can be automatically attached to the bladder with high efficiency without requiring any manual operation.

While the invention has been particularly shown and described with reference to preferred embodiments thereof, it will be understood by those skilled in the art that the foregoing and other changes in form and details can be made therein without departing from the scope of the claims.

What is claimed is:

1. A method for attaching a belt member to the outer circumerential surface of at least one bladder of a tire forming drum, comprising steps of positioning the forward end of at least one belt member proximate the outer circumferential surface of the bladder, filling pressurized air into the bladder while said bladder is rotated, detecting the outer diameter of the bladder, stopping the filling of the pressurized air when the bladder has been inflated to a predetermined outer diameter and stopping the rotation of the bladder when the bladder has been inflated to the predetermined outer diameter as detected, fixing the forward end of the belt member on the bladder by means of a fixture, rotating the bladder together with said fixture to wind and attach the belt member around and to the outer circumferential surface of the bladder, and removing said fixture from the bladder after completion of the attaching of the belt member to the bladder.

2. The method as set forth in claim 1, wherein said positioning step comprises allowing the forward end of the belt member to hang downward a predetermined length above the bladder so that the forward end lies on the outer circumferential surface of the bladder when it is inflated to the predetermined diameter.

3. The method as set forth in claim 1, wherein an iron ring is disposed adjacent said bladder and is rotatable together with the bladder, a fixture extends between the iron ring and said predetermined position on the outer circumferential surface of the bladder, said fixture being provided with a magnet at one end thereof on the side of the iron ring and having a restraining portion formed on the other end thereof on the side of the bladder for urging the forward end of the belt member against the outer circumferential surface of the bladder, and a fixture holding unit, which is vertically movable, is provided for releasably holding said fixture.

4. The method as set forth in claim 3, wherein in the step of removing the fixture from the bladder, the fixture is removed by pivoting the fixture to raise one end of the fixture which has urged the forward end of the belt member.

* * * * *